US007802188B2

(12) United States Patent
Wu

(10) Patent No.: US 7,802,188 B2
(45) Date of Patent: Sep. 21, 2010

(54) METHOD AND APPARATUS FOR IDENTIFYING SELECTED PORTIONS OF A VIDEO STREAM

(75) Inventor: Peng Wu, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1294 days.

(21) Appl. No.: 10/844,386

(22) Filed: May 13, 2004

(65) Prior Publication Data
US 2005/0257151 A1 Nov. 17, 2005

(51) Int. Cl.
*G06F 3/00* (2006.01)
(52) U.S. Cl. ..................... 715/723; 715/716
(58) Field of Classification Search ............. 715/719, 715/720, 721, 723, 716
See application file for complete search history.

(56) References Cited

U.S. PATENT DOCUMENTS

| 5,521,841 | A * | 5/1996 | Arman et al. ............. 715/723 |
| 6,774,917 | B1 * | 8/2004 | Foote et al. ............... 715/700 |
| 7,199,841 | B2 * | 4/2007 | Suh .......................... 348/700 |
| 2002/0006221 | A1 * | 1/2002 | Shin et al. ................ 382/181 |
| 2002/0054083 | A1 * | 5/2002 | Boreczky et al. ........... 345/738 |
| 2002/0163532 | A1 * | 11/2002 | Thomas et al. ............ 345/723 |
| 2004/0125877 | A1 * | 7/2004 | Chang et al. .......... 375/240.28 |

OTHER PUBLICATIONS

"Extract Highlights From Baseball Game Video With Hidden Markov Models", by P. Chang et al., Proceedings of the International Conference on Image Processing (ICIP 02) 2002.
"Evolving Video Skims Into Useful Multi-Media Abstractions", by Christel, Michael G., et al., Proc. Human Factors in Computing Systems, Los Angeles, CA, US, pp. 171-178, 1998.
"A Semi-Automatic Approach to Home Video Editing" by Girgensohn, Andreas et al., Proc. The 13th Annual ACM Symposium on User Interface Software and Technology, San Diego, CA, US, pp. 81-89, 2000.
"Abstracting Home Video Automatically", by Lienhart, Rainer, Proc. The 7th ACM International Conference on Multimedia, Orlando, FL. US pp. 37-40, 1999.
"An Indexing and Browsing System for Home Video", by Ma, Wei-Ying, EUSIPCO 2000, 10th European Signal Processing Conference, Sep. 5-8, 2000, Tampere, Finland.
"Learning Personalized Video Highlights From Detailed MPEG 7 Metadata", by Jaimes, A. et al., Proc. International Conference on Image Processing, vol. 1, pp. 133-136, 2002.

(Continued)

*Primary Examiner*—Weilun Lo
*Assistant Examiner*—Tuyetlien T Tran

(57) ABSTRACT

A method is disclosed for identifying a selected portion of a video stream. A user interface is provided for designating a reference frame of a selected portion of a video stream. A processor is configured to compare the reference frame with other portions of the video stream to establish a similarity measure, process the similarity measure to identify a candidate region as a boundary of the selected portion of the video stream, and provide user access to the candidate region to designate the boundary for storage via the user interface.

29 Claims, 2 Drawing Sheets

OTHER PUBLICATIONS

"Semantic Video Content Abstraction Based on Multiple Cues", by Li, Ying et al, Proc. ICME 2001, Japan, Aug. 2001.

"Video Skimming and Characterization Through the Combination of Image and Language Understanding", by Smith, M.A., Proc. IEEE Workshop on Content-Based Access of Image and Video Database, pp. 61-70, 1998.

"Automatic Partitioning of Full-Motion Video", by H.J. Zhang et al., Multimedia Systems, vol. 1, No. 1, pp. 10-28, 1993.

* cited by examiner

METHOD AND APPARATUS FOR IDENTIFYING SELECTED PORTIONS OF A VIDEO STREAM

CROSS REFERENCE TO RELATED APPLICATIONS

This application is related to a U.S. patent application of Ying Li, Tong Zhang, Daniel Tretter, "Scalable Video Summarization And Navigation System And Method", assigned Ser. No. 10/140,511 and filed May 7, 2002.

BACKGROUND

Techniques for identifying highlight portions of a recorded video stream can be classified in two general categories: (1) automatic video highlight detection; and (2) manual home video editing.

Regarding the first category, a first technique is known which detects highlights of a domain specific recorded video, such as a sports video or news video. Prior domain knowledge of the domain specific video can be used to identify highlights of the video. For example, a specific event, such as the scoring of a touchdown in football, can be identified using anticipated video characteristics of video segments which contain this event based on a priori knowledge. Predefined portions of a video can be detected as a highlight, with desired highlights being associated with various types of scene shots which can be modeled and computed. By detecting the occurrence of a scene shot, the user can estimate the occurrence of a desired highlight.

Representative portions of a video sequence can be related to a highlight to compose a skimmed view. Predefined audio cues, such as noun phrases, can be used as indicators of desired video portions.

Regarding the second category, one technique for identifying specific segments of a domain generic video is available with the Adobe Premiere Product. With this product, specified portions of a video stream considered of interest are identified manually. In contrast to domain specific video, generic videos (e.g., home videos) do not contain a specific set of known events. That is, a priori knowledge does not exist with respect to generic videos because little or no prior knowledge exists with respect to characteristics associated with portions of the video that may constitute a highlight.

Home video annotation/management systems are known for creating videos from raw video data using a computed unsuitability "score" for segments to be contained in a final cut based on erratic camera motions. A set of editing rules combined with user input can be used to generate a resultant video.

A time-stamp can be used to create time-scale clusters at different levels for home video browsing. Video browsing and indexing using key frame, shot and scene information can be used. A face tracking/recognition functionality can be used to index videos.

Exemplary editing software for video editing involves having the user manually identify a specified portion of a video stream by first browsing the video to identify an interesting video segment. The user then plays the video forward and backward, using a trial and error process to define the start and end of the desired video segment. Upon subjectively locating a desired portion of the video stream, the user can manually zoom in, frame-by-frame, to identify start and end frames of the desired video segment.

SUMMARY OF THE INVENTION

An apparatus is disclosed for identifying a selected portion of a video stream. The apparatus comprises a user interface for designating a reference frame of a selected portion of a video stream; and a processor configured to compare the reference frame with other portions of the video stream to establish a similarity measure, process the similarity measure to identify a candidate region which possibly contains a boundary of the selected portion of the video stream, and provide user access to the candidate region to designate the boundary via the user interface.

A method is also disclosed for identifying a selected portion of a video stream. The method comprises receiving a designated reference frame of a selected portion of the video stream; comparing the reference frame with other portions of the video stream to establish a similarity measure; processing the similarity measure to identify a candidate region which possibly contains a boundary of the selected portion of the video stream; and providing user access to the candidate region to designate the boundary.

BRIEF DESCRIPTION OF THE DRAWINGS

Other features and advantages will become apparent to those skilled in the art upon reading the following detailed description of preferred embodiments, in conjunction with the accompanying drawings, wherein like reference numerals have been used to designate like elements, and wherein.

DETAILED DESCRIPTION

Figure 1:
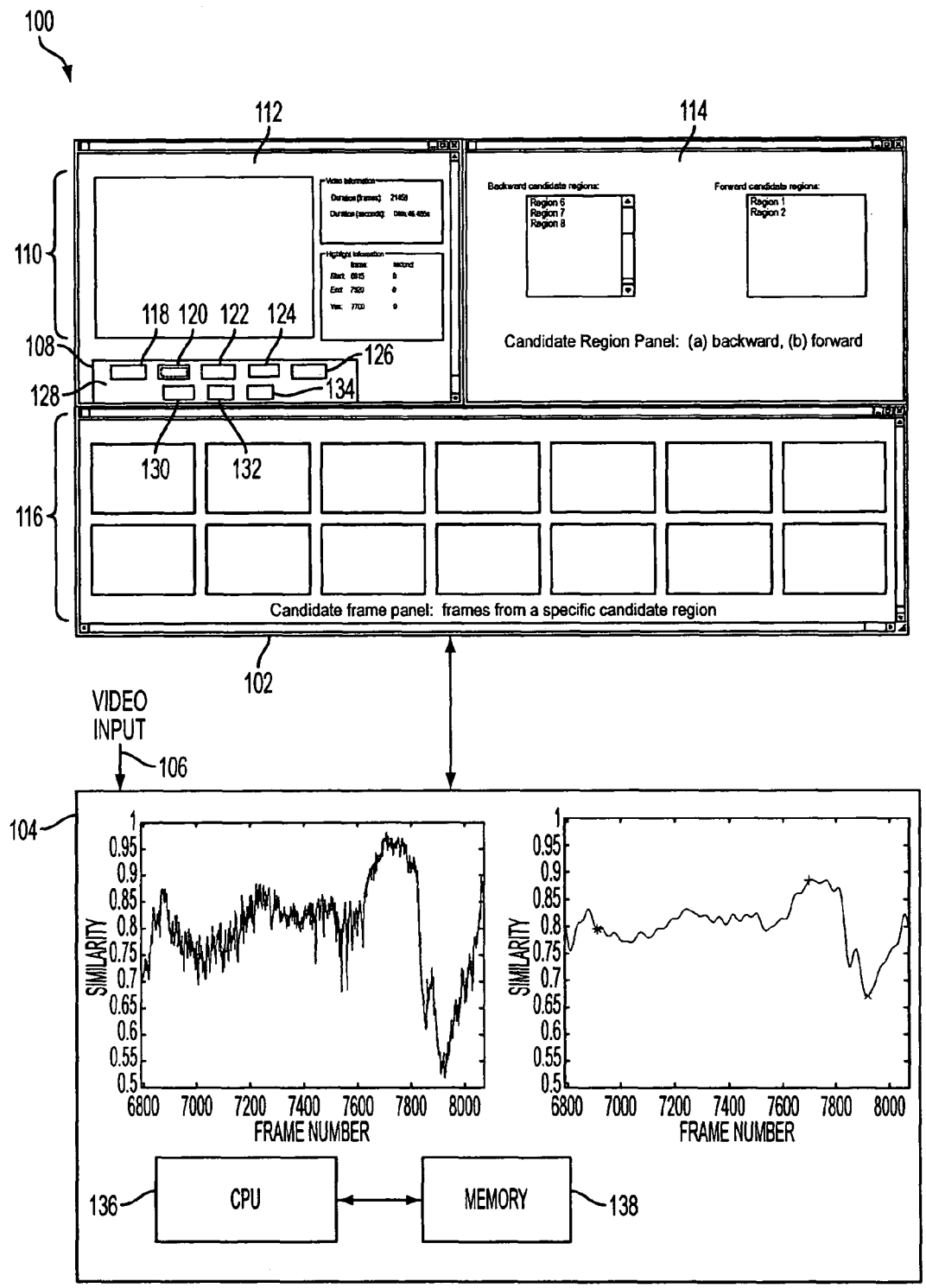
FIG. 1 shows an exemplary user interface and processor in a system for identifying a selected portion of a video stream.

FIG. 1 shows an exemplary apparatus, represented as a system 100, for identifying a selected portion of a video stream. The FIG. 1 system includes a graphical user interface (GUI) 102. The user interface is configured as a display operated in association with a processor 104. The user interface is provided for designating a reference frame of a selected portion of a video stream, the video stream being supplied to the processor 104 via a video input 106. The video input can be a live or recorded video feed, or can be a video input supplied to the processor via a disk. The video input 106 can also be considered to represent any manner by which the video stream is supplied to the processor at any point in time and stored, for example, on an internal memory (e.g., hard disk). Those skilled in the art will appreciate that the video input need not be stored within the processor 104, but can be remotely located and accessed by the processor 104.

The user interface includes a control panel 108. The control panel 108 can include user actuator software buttons. These buttons can be activated using, for example, a mouse or can be accessed via a touch screen that can be directly activated by the user.

The user interface 102 also includes a first display region 110 for displaying a video sequence. The first display region can include a first area 112 for displaying a reference frame of the video stream. The first display region 110 can also include a second area 114 containing one or more lists of candidate regions which possibly contain start and/or end frames or boundaries, of a video sequence. Each of the candidate regions in a forward list contains a set of one or more frames that includes a possible end frame, or boundary region, of a selected highlight. Each of the candidate regions in a backward list contains a set of one or more frames that includes a possible start frame, or boundary, of the selected highlight.

The display includes a second display region 116 for displaying multiple frames associated with one or more of the candidate regions selected from the candidate region lists. The frames of each candidate region can be successive frames, or can be separated by any desired separation distance (e.g., every other frame can be displayed). In an exemplary embodiment, the upper row of displayed frames can correspond to frames from a user selected candidate region in the backward list, and the lower row can correspond to frames from a user selected candidate region in the forward list. Alternately, any desired display configuration can be used to display any or all frames associated with the candidate regions.

The software buttons in the control panel 108 can include, for example, a "play" button 118 for sequencing the video stream on the first area 112 of display region 110, a "pause" button 120 for pausing the video stream, a "stop" button 122 for stopping the video stream, and "fast-forward" button 124/"fast-backward" button 126 for more quickly sequencing through the frames of a video stream.

Manual selection of a highlight can be performed using two highlight detection buttons 128 which allow for manual selection of a portion of the video sequence that the user wishes to designate as a highlight. A "start" button 130 is provided for allowing the user to manually select a start frame as a start boundary associated with a selected portion of the video stream that is to be highlighted. An "end" button 132 is provided for allowing the user to manually select an end frame as a closing boundary of the selected portion of the video stream.

To provide for a more automated selection process, a "yes" button 134 is provided to allow the user to select a particular displayed video frame as a reference frame. The reference frame is a frame from the video stream which the user considers to be included in a selected portion of a video stream that the user wishes to highlight. The use of this button will be described in further detail in connection with a method described herein for automated assistance in locating start and end frames, or boundaries, of the selected portion of the video stream.

The processor 104 can include a central processing unit 136 and associated memory 138. The memory 138 can, store a set of instructions configured as a computer program. For example, in executing the program stored in memory 138, the processor can become configured to compare a reference frame of the video stream with other portions of the video stream to establish a similarity measure. The processor can be configured to process the similarity measure to identity a candidate region which, based on results of the similarity measure, possibly (i.e., more likely than not) contains a boundary of the video stream. The processor can also be configured to provide user access to the candidate region to designate the boundary. Information regarding the reference frame, the candidate regions and the selected boundaries can be stored in a memory, such as memory 138 or any other memory device.

Operation of the exemplary FIG. 1 embodiment will be described in the context of a program executed by the central processing unit 136 of the processor 104, with reference to the exemplary flow chart of FIG. 2.

Figure 2:
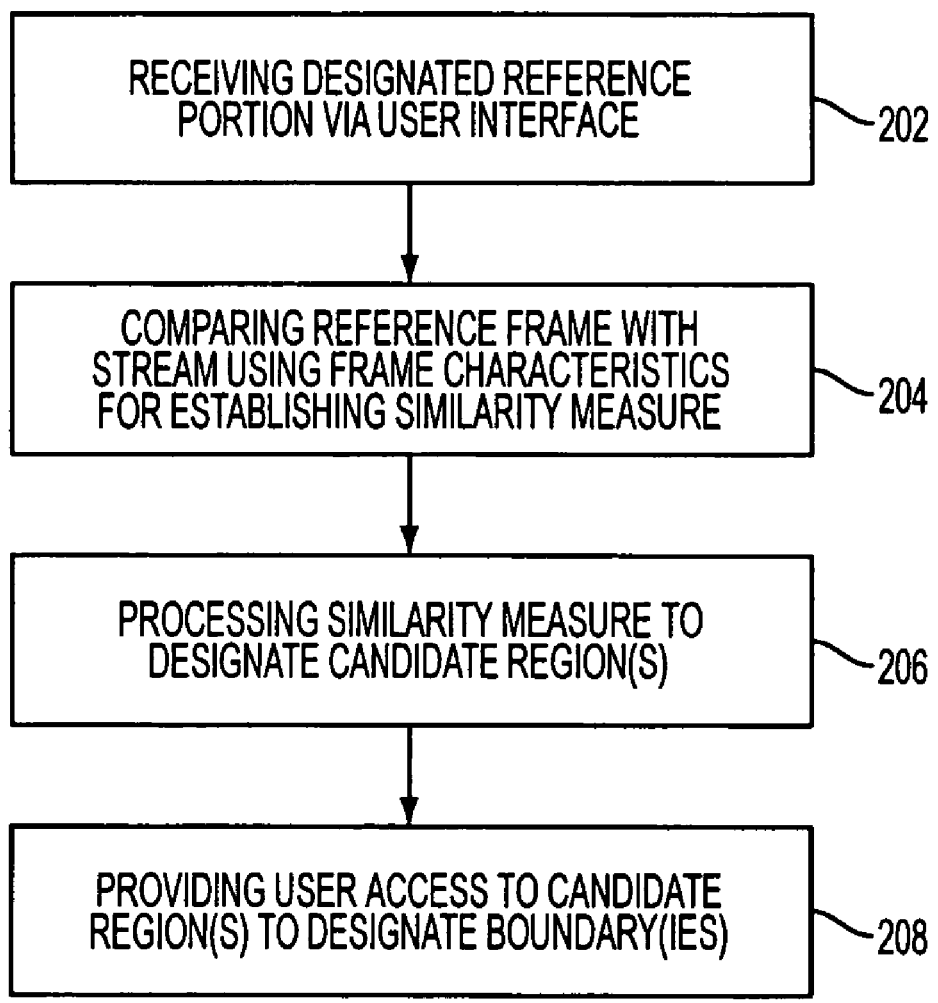
FIG. 2 shows a flowchart of an exemplary program executed by the FIG. 1 processor.

In FIG. 2, method 200 is provided for identifying a selected portion of a video stream, such as a desired highlight. Generally speaking, exemplary embodiments construct a new user environment to reduce and simplify editing of a video stream when attempting to locate the start and end frames, or boundaries, of a selected portion constituting a highlight.

The video stream can be preprocessed to extract characteristic features, such as color histogram, edge energy and/or any other desired characteristic feature, for each video frame of the sequence. Using the characteristic features for each frame of the video sequence, the video sequence can be optionally broken into a series of shots where each shot corresponds to a segment of the original video stream. Thus, the preprocessing can be used to characterize each frame so that: (1) the video stream can be broken into a series of shots, and (2) the frames can be compared in a meaningful way to identify boundary frames of a highlight included within a shot, based on a user selected reference frame. The extraction of characteristic features can alternately be performed at any time prior to the comparison of a reference frame with another frame in the video sequence.

In an exemplary embodiment, for each frame "$f_j$" where j equal 1 to L, with L being the total number of frames of a video sequence, $C_j$ and $E_j$ constitute color and edge energy characteristic feature vectors, respectively.

The color descriptor $C_j$ can be a color histogram of 256 bins constructed in YUV color space. The color bins are populated for a given frame based on the color content of the frame, as quantified in a given color space (such as the YUV color space) for all pixels in the frame.

The edge energy descriptor $E_j$ can be a standard deviation of the edge energy of frame, and can be computed by applying the Prewitt edge operation to a directional component (e.g., the Y-axis component) of an image frame in a manner as described in U.S. application Ser. No. 10/140,511, filed May 7, 2002, entitled "Scalable Video Summarization And Navigation System And Method".

Two exemplary gradients $G_R$ and $G_C$ used in edge detection, representing row and column gradients, respectively, are:

$$G_R = \frac{1}{3}\begin{bmatrix} 1 & 0 & -1 \\ 1 & 0 & -1 \\ 1 & 0 & -1 \end{bmatrix} \text{ and } G_c = \frac{1}{3}\begin{bmatrix} -1 & -1 & -1 \\ 0 & 0 & 0 \\ 1 & 1 & 1 \end{bmatrix}$$

To compute edge energy using these two gradient matrices, the following exemplary pseudo code can be implemented:

---

```
Edge energy computation:
Input: ImageBuffer[height][width] (Y channel of YUV)
ComputeStdEdgeEnergy(ImageBuffer)
{
// define filter for detecting vertical edge: Gr
weightR[0] = weightR[3] = weightR[6] = 1;
weightR[1] = weightR[4] = weightR[7] = 0;
weightR[2] = weightR[5] = weightR[8] = -1;
// define filter for detecting horizontal edge: Gc
weightC[6] = weightC[7] = weightC[8] = 1;
weightC[3] = weightC[4] = weightC[5] = 0;
weightC[0] = weightC[1] = weightC[2] = -1;
// define the filtered image buffer
FilteredImage[height-2][width-2];
// filtering the ImageBuffer with "Prewitt" filters
mean = std = 0.0;
for (i=1; i<height-1; i++)
```

-continued

```
    for (j=1; j<width-1; j++)
    {
        tmpx = tmpy = 0.0;
        // compute Row and Column gradient
        for (m=-1; m<2; m++)
            for (n=-1; n<2; n++)
            {
                // Row
                tmpx weightR[(m+1)*3+(n+1)]*ImageBuffer[i+m][j+n];
// Column
tmpy+= weightC[(m+1)*3+(n+1)]*ImageBuffer[i+m][j+n];
            }
        FilteredImage[i-1][j-1] = sqrt(tmpx*tmpx + tmpy*tmpy);
        mean += FilteredImage[i-1][j-1];
    }
// compute mean of edge energy
mean /= (height-2)*(width-2)*1.0;
    // compute the standard deviation of edge energy
    for(i=0;i<(height-2);i++)
        for(j=0;j<(width-2);j++)
            std+=(FilteredImage[i][j]-mean)* (FilteredImage[i][j]-mean)
    std = sqrt(std/(height-2)*(width-2)*1.0);
    return std;
}
```

In the foregoing pseudocode, the Image Buffer is used to store all pixel values of an image. To compute the standard edge energy, the "filters" are defined as the two matrices. The values "j" and "i" correspond to the total number of pixels in vertical and horizontal directions, respectively. The filtering function is an iterative process used to calculate two values for a given set of nine pixels in the image (one value for each matrix). That is, the $G_R$ matrix is first applied to the nine pixel values in an upper left corner of the frame to produce a first value $A_O$, and the $G_C$ matrix can be applied in parallel to the same pixel values to produce a first value $B_O$. This process can be repeated iteratively by sequentially applying $G_R$, $G_C$ to each nine pixel group of the frame (of course any desired matrix size can be used).

Thus, for each location of each matrix over the pixels of the frame, values for $A_N$, $B_N$ can be calculated, where N represents a location of the two matrices over the pixels over a given frame. The matrices are moved row-by-row and column-by-column over the entire set of pixels in the frame, and values of $A_N$, $B_N$ are calculated for each location of the matrices.

In the function "Filtered Image", the energy $P_N$ for each pixel associated with a center of matrices $G_R$, $G_C$ can be calculated as:

$P_N = \sqrt{\sqrt{A_N^2 + B_N^2}}$

Afterwards, the sum of all values $P_N$ can be calculated for a given frame, and divided by the number of values "N", to produce an average energy value for the frame:

$\Sigma P_N / N$

After calculating the average energy (mean) using the function "mean" in the pseudocode, the standard deviation can be calculated by dividing the accumulated deviations with the total number of pixels in the frame.

When comparing frames using these or other suitable feature characteristics, L-1 distance values on each of the characteristic features can be used as a measure of frame dissimilarity (e.g., a measure of the difference between sequential frames). That is, in comparing a frame of the video stream with another frame of the video stream, the desired frame characteristic features, such as color and/or edge energy, can be compared to produce a difference vector.

After acquiring characteristic feature information for each frame of the video sequence, the video is segmented into shots. For example, the video sequence can be segmented into shots using a color histogram based shot detection. Such a process is described, for example, in a document entitled "Automatic Partitioning Of Full-Motion Video", by H. J. Zhang et al., Multimedia Systems, Vol. 1, No. 1, pp. 10-28, 1993.

An exemplary shot detection procedure based on color histogram is as follows:

Shot detection example:
Notations:
$f_j$, j=1, . . . , L, L is the total number of frames (f)
$C_j$, color characteristic feature vector (histogram, in this case).

Shot detection steps:
Step 1: Compute the histogram shot distances (SD):

$$SD_j = \sum_{m=1}^{M} |C_j(m) - C_{j+1}(m)|, j = 1, \ldots, L-1; M = L-1$$

Step 2: Compute mean µ and standard deviation σ of $SD_j$, j=1, . . . , L-1

Step 3: Set threshold (T)

$T = \mu + \alpha \sigma$ where α is a constant. A typical value of α is 5 or 6, or any other suitable value.

Step 4: For j=1, . . . , L-1, if $SD_j$>T, a shot boundary is declared at frame $f_j$ Where detected shots are labeled "$S_i$", with i equal 1 . . . N, with N being the total number of shots, a selected portion of the video stream corresponding to a desired highlight can, for example, be assumed to reside within each shot.

In block 202, a user selects a reference frame of the video stream for receipt by the processor 104. This reference frame is used to produce a similarity trail from which one or more candidate regions are identified. Each candidate region constitutes a sequence of one or more frames which possibly contain a start or end frame of a selected portion (highlight) of the video sequence. By having broken the original video stream into shots, the number of candidate regions identified as possibly containing start or end frames of a video highlight are chosen, in an exemplary embodiment, only from within the shot identified as containing the reference frame.

In block 202, the user can activate the "play" button to sequence through the video. The video can be displayed in the first area 112 of the FIG. 1 user interface 102. If a displayed reference frame constitutes a portion of a desired highlight, the user can indicate this by activating the "yes" button to select this portion of the video stream. Otherwise, the user can choose to change the frame displayed until an acceptable frame of the video sequence has been selected using the "yes" button.

Upon activation of the "yes" button, the video sequence displayed can be paused automatically. Alternately, the video can continue to play, in which case, the frame displayed at the time the "yes" button was activated will be used as the reference frame.

After the "yes" button is activated to select a video frame within the area 112 as a reference frame, a plurality of associated candidate regions which possibly contain a boundary (e.g., a start or an end frame) of a video segment which contains the reference frame, will be listed in the second area 114. The selected reference frame is then received by the processor.

The selected portion of the video stream which corresponds to a desired highlight is a sequence of frames bounded by start and end frames that define the highlight. The highlight can be considered a sequence of video data, wherein successive frames bear some relationship to one another. For example, the successive frames can constitute a particular event of significance to the user, that the user may wish to later clip from the video stream, and forward to a different location in memory. For example, a highlight might be a child blowing out candles on a birthday cake, included within a shot that corresponds with an entire birthday party. Exemplary embodiments described herein simplify the detection of the boundaries associated with the reference frame.

In block 204 of FIG. 2, the designated reference frame selected by the user via the "yes" button of FIG. 1, is compared with other frames included in the video stream using frame characteristics. The comparison is used to produce one or more quantities for establishing a similarity measure. The similarity measure is later used to identify the candidate regions listed in the second area 114 of the FIG. 1 user interface 102.

To produce the similarity measure, each frame within a shot of the video stream can be compared with the reference frame to graphically establish a frame-by-frame similarity measure. For example, in the FIG. 1 processor 104, a similarity measure is illustrated. Peaks of the similarity measure correspond to frames within the shot which have a high similarity with respect to the reference frame. In the FIG. 1 example, the peak of highest similarity corresponds to a comparison of the reference frame with itself. Secondary peaks correspond to frames having characteristics similar to the reference frame.

To provide the graphically represented similarity trail, the user selected reference frame is denoted as f*. Where $S_i$ is considered to be a shot that contains and begins at frame $f_m$ and ends at $f_n$, then a similarity trail "T" can be represented as a one dimensional function for that shot:

$$T(j)=1-(d_{color}(C_j, C^*)+d_{edge}(E_j, E^*))/2$$

where $m \leq j \leq n$, and where C and E denote the color and edge energy feature descriptors, respectively. The $d_{color}$ and $d_{edge}$ are the dissimilarity measures for color and edge energy features.

In an exemplary embodiment, a normalized L−1 distance is used to compute both $d_{color}$ or and $d_{edge}$. That is, the comparing of the reference frame with other portions of the video stream can be processed to normalize multiple quantities used in producing the similarity measure.

In an exemplary embodiment, the comparing can include filtering, (e.g., low pass filtering) of the similarity measure. In FIG. 1, data of the similarity measure can be filtered to produce a filtered similarity measure. The right hand side of the processor 104 of FIG. 1 illustrates the data of the similarity measure after low pass filtering. In this graphical illustration, the "+" indicates a reference frame provided by the user, and constitutes the highest peak of the similarity measure. The "*" indicates a start frame of a desired portion of the video stream (e.g., a start boundary of the highlight), and an "x" indicates an end boundary of the video stream (e.g., an end boundary of the desired portion of the video start stream).

In block 206, candidate region finding is used to identify the candidate regions of the candidate region lists provided in the second area 114 of the FIG. 1 user interface 102.

In an exemplary embodiment of the localized similarity trail produced using the aforementioned equation T, candidate boundary regions can be defined as the valleys of the trail. The low pass filtering can be applied to the original trail to remove small variations on the trail. In the graphical illustration of FIG. 1, the valleys cover the boundary (i.e., start and end) frames.

Using the filtered similarity trail, identified candidate regions can be denoted, for example, as $R_k$ where k equals 1 . . . k, with k being the total number of candidate regions. For each valley, a number of frames associated with the valley can be selected. For example, a set number of frames extending from each valley in a first direction, such as a direction away from a reference frame, can be selected as a candidate region. Alternately, a set of frames extending from each valley in directions on either side of the valley can be selected as a candidate region. Each region can, for example, contain a number of frames which are centered at the valley frame of the region.

A candidate region displayed in the second display region 116 of FIG. 1 can include frames from a selected region. Each region $R_k$ can be arranged such that $R_{k-1}$, appears before $R_k$ for any k. That is, plural candidate regions can be listed on the FIG. 1 user interface in order, using a proximity of each candidate region to the reference frame. This proximity can be physical (e.g., temporal) proximity based on the location of each candidate region within the video stream, or a qualitative proximity based on the assessment of the characteristic features of the candidate region as compared to the reference frame, or other suitable proximity.

In the aforementioned equation, a value $T_j$ can be computed for every frame of a shot. For example, for a first frame in a shot, T corresponds to a first point on the similarity measure shown in the left hand side of the processor 104.

Where plural candidate regions have been identified as possibly containing boundaries of the video stream, one of the plural candidate regions can be designated as including a start boundary, and another of the candidate regions can be designated as including an end boundary. Plural candidate regions can be identified for each of the start and end boundary regions.

Candidate region finding can be implemented to identify candidate regions using the following pseudo code:

```
title: pseudocode for finding candidate regions:
input: reference frame (from the user's indication)
FindCandidateRegion(reference frame)
{
    find the shot (scene) that contains the reference frame
    construct the localized similarity trail by computing similarity
between the reference frame with each of the frame in the shot (scene)
    low pass filtering of the localized similarity trail
    find all the valleys on the filtered trail
    for (each of the valleys)
    {
        group the N frames temporally closest to the valley frame
as one candidate region
    }
    return the candidate regions
}
```

In operation, a selected portion of the video stream, as defined by start and end frames, can be detected as follows. Assuming that the preprocessing has been completed, and the user has clicked the "yes" button of the user interface to designate a reference frame, the processor 104 automatically produces the filtered similarity measure from which one or more candidate region lists are generated and displayed in the area 114 of the user interface. Each candidate region list includes a set of candidate regions, wherein a candidate region includes one or more sequential frames from the video sequence. Each candidate region is a sequence of one or more video frames which is considered to possibly contain (i.e., more likely than not) a start frame or an end frame of the selected portion of the video sequence which corresponds to the desired highlight.

Based on a user selection from the candidate region lists, one or more frames of a selected candidate region(s) is presented in the second display region 116 of the user interface 102. The "backward candidate regions" and the "forward candidate regions" of the second area 114 provide a backward candidate region list and a forward candidate region list respectively, each containing potential start and end frames, respectively, of the highlight.

In an exemplary embodiment, the user selects a candidate region from each candidate region list, and an associated set of frames contained in that region are presented in the second display region 116 as a candidate frame panel. The user can review the frames of the selected backward candidate region to determine whether they contain a suitable start frame of the desired highlight. The user can review the frames of the selected forward candidate region to determine whether they contain a suitable end frame of the desired highlight.

It will be appreciated by those skilled in the art that in other embodiments can be implemented without departing from the spirit or essential characteristics described herein. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

The invention claimed is:

1. Apparatus, comprising
a memory storing computer-readable instructions, and
a data processing unit coupled to the memory, operable to execute the instructions, and based at least in part on the execution of the instructions operable to perform operations comprising:
in response to user input, selecting a reference in a video comprising a sequence of frames;
determining a sequence of values of a similarity measure from respective comparisons between the reference and a respective ones of the frames of the video;
identifying in the video one or more candidate regions of ones of the frames of the video based on identification of one or more respective valleys in the sequence of similarity measure values, wherein each of the one or more identified candidate regions comprises a frame of the video that corresponds to a respective one of the one or more valleys in the sequence of similarity measure values; and
in response to user selection of at least one of the candidate regions, presenting one or more of the frames of the selected candidate region on a display; and
in response to user input, designating at least one of the presented frames as a boundary of a segment of the video.

2. The apparatus of claim 1, wherein based at least in part on the execution of the instructions the data processing unit is operable to perform operations comprising generating on the display a user interface that comprises:
a control panel having user actuatable software buttons;
a first display region displaying a user-selectable identification for each of the candidate regions; and
a second display region displaying user-selectable representations of the one or more frames of the selected candidate region.

3. The apparatus of claim 1, wherein in the identifying the data processing unit is operable to perform operations comprising determining the similarity measure values from respective frame-by-frame similarity comparisons between the reference and ones of the frames of the video.

4. The apparatus of claim 1, wherein in the determining the data processing unit is operable to perform operations comprising ascertaining feature values respectively characterizing ones of the frames of the video, and determining the similarity measure values from respective comparisons between at least one of the feature values characterizing the reference and at least one of the feature values characterizing other frames of the video.

5. The apparatus of claim 1, wherein based at least in part on the execution of the instructions the data processing unit is operable to perform operations comprising filtering the sequence of similarity measure values to produce a filtered sequence of similarity measure values.

6. The apparatus of claim 1, wherein each of the similarity measure values is determined from a respective comparison between at least one feature of the reference and at least one feature of a respective one of the frames of the video.

7. The apparatus of claim 1, wherein based at least in part on the execution of the instructions the data processing unit is operable to perform operations comprising normalizing multiple quantities used to determine the similarity measure values.

8. The apparatus of claim 1, wherein in the identifying the data processing unit is operable to perform operations comprising identifying the one or more valleys in the sequence of similarity measure values.

9. A computer-implemented method, comprising:
in response to user input, selecting a reference in a video comprising a sequence of frames;
determining a sequence of values of a similarity measure from respective comparisons between the reference and respective ones of the frames of the video;
identifying in the video one or more candidate regions of ones of the frames of the video based on identification of one or more respective valleys in the sequence of similarity measure values, wherein each of the one or more identified candidate regions comprises a frame of the video that corresponds to a respective one of the one or more valleys in the sequence of similarity measure values;
in response to user selection of at least one of the candidate regions, presenting one or more of the frames of the selected candidate region on a display; and
in response to user input, designating at least one of the presented frames as a boundary of a segment of the video.

10. The method of claim 9, wherein the reference is a frame in the segment of the video.

11. The method of claim 9, wherein the similarity measures are determined from a respective comparison between the reference and respective other ones of the frames in a predetermined shot of the video that comprises the reference.

12. The method of claim 9, wherein the determining comprises ascertaining the similarity measure values from respective comparisons between the reference and respective ones of the frames of the video on a frame-by-frame basis.

13. The method of claim 12, further comprising generating on the display a miser interface that enables a riser to designate a portion of the video as the reference.

14. The method of claim 9, further comprising generating on the display a user interface that enables a user to designate a portion of the video as the reference.

15. The method of claim 9, further comprising filtering the sequence of similarity measure values to produce a filtered sequence of similarity measure values.

16. The method of claim 9, wherein each of the similarity measure values is determined from a respective comparison between at least one feature of the reference and at least one feature of a respective one of the frames of the video.

17. The method of claim 16, wherein the at least one feature comprises a color histogram metric.

18. The method of claim 16, wherein the at least one feature comprises an edge energy metric.

19. The method of claim 16, wherein the at least one feature is represented as a vector quantity.

20. The method of claim 9, further comprising normalizing multiple quantities used to produce the similarity measure values.

21. The method of claim 9, wherein the identifying comprises ascertaining the one or more valleys in the sequence of the similarity measure values.

22. The method of claim 21, wherein the identifying comprises for each of the one or more ascertained valleys selecting frames of the video near the valley as a respective one of the candidate regions.

23. The method of claim 22, wherein the selecting comprises, for each of the one or more ascertained valleys, selecting as a respective one of the candidate regions a respective set of frames of the video that are between the reference and a boundary one of the frames that coincides with the valley and that are bounded at one end by the boundary frame.

24. The method of claim 22, wherein the selecting comprises, for each of the one or more ascertained valleys, selecting as a respective one of the candidate regions a respective set of frames of the video that are bounded at one end by a boundary one of the frames that coincides with the respective valley.

25. The method of claim 22, wherein the selecting, comprises, for each of the one or more ascertained valleys, selecting as a respective one of the candidate regions a respective set of frames that comprise a respective one of the frames that coincides with the respective valley.

26. The method of claim 9, comprising: identifying one of the plural candidate regions as possibly containing a start frame of the selected portion of the video stream.

27. The method of claim 9, further comprising classifying each of the candidate regions as either a candidate end frame region or a candidate start frame region.

28. The method of claim 9, further comprising presenting on the display a list of identifiers corresponding to the candidate regions in order of proximity of the corresponding candidate regions to the reference.

29. At least one memory having computer program code embodied therein, the computer-readable program code adapted to be executed by a computer to perform a method comprising:
- in response to user input, selecting a reference in a video comprising a sequence of frames;
- determining a sequence of values of a similarity measure from respective comparisons between the reference and a respective ones of the frames of the video;
- identifying in the video one or more candidate regions of ones of the frames of the video based on identification of one or more respective valleys in the sequence of similarity measure values, wherein each of the one or more identified candidate regions comprises a frame of the video that corresponds to a respective one of the one or more valleys in the sequence of similarity measure values;
- in response to user selection of at least one of the candidate regions, presenting one or more of the frames of the selected candidate region on a display; and
- in response to user input, designating at least one of the presented frames as a boundary of a segment of the video.

* * * * *

UNITED STATES PATENT AND TRADEMARK OFFICE
CERTIFICATE OF CORRECTION

| | |
|---|---|
| PATENT NO. | : 7,802,188 B2 |
| APPLICATION NO. | : 10/844386 |
| DATED | : September 21, 2010 |
| INVENTOR(S) | : Peng Wu |

It is certified that error appears in the above-identified patent and that said Letters Patent is hereby corrected as shown below:

In the Claims

In column 10, line 66, in Claim 13, delete "miser" and insert -- user --, therefor.

In column 10, line 66, in Claim 13, delete "riser" and insert -- user --, therefor.

In column 12, line 1, in Claim 25, delete "selecting," and insert -- selecting --, therefor.

Signed and Sealed this
Fourth Day of June, 2013

Teresa Stanek Rea
*Acting Director of the United States Patent and Trademark Office*